(12) United States Patent
Shine et al.

(10) Patent No.: US 9,934,027 B2
(45) Date of Patent: Apr. 3, 2018

(54) METHOD AND APPARATUS FOR THE DEVELOPMENT, DELIVERY AND DEPLOYMENT OF ACTION-ORIENTED BUSINESS APPLICATIONS SUPPORTED BY A CLOUD BASED ACTION SERVER PLATFORM

(71) Applicants: Steve Shine, Berkshire (GB); Dave Postle, Berkshire (GB); Emma K. McGrattan, Islandia, NY (US); David Murphy, Redwood City, CA (US); Christopher Lochhead, Redwood City, CA (US)

(72) Inventors: Steve Shine, Berkshire (GB); Dave Postle, Berkshire (GB); Emma K. McGrattan, Islandia, NY (US); David Murphy, Redwood City, CA (US); Christopher Lochhead, Redwood City, CA (US)

(73) Assignee: ACTIAN CORPORATION, Redwood City, CA (US)

( * ) Notice: Subject to any disclaimer, the term of this patent is extended or adjusted under 35 U.S.C. 154(b) by 848 days.

(21) Appl. No.: 13/622,882

(22) Filed: Sep. 19, 2012

(65) Prior Publication Data
US 2013/0073614 A1    Mar. 21, 2013

Related U.S. Application Data

(60) Provisional application No. 61/537,571, filed on Sep. 21, 2011.

(51) Int. Cl.
*G06F 15/16* (2006.01)
*G06F 9/44* (2018.01)

(52) U.S. Cl.
CPC . *G06F 8/70* (2013.01); *G06F 8/20* (2013.01)

(58) Field of Classification Search
CPC .......... H04W 4/003; H04L 67/10; G06F 8/30; G06F 3/0482; G06F 8/20; G06Q 10/06375
See application file for complete search history.

(56) References Cited

U.S. PATENT DOCUMENTS 6,343,275 B1    1/2002  Wong
7,448,048 B1   11/2008  Nesamoney et al.
(Continued)

OTHER PUBLICATIONS

PCT International Search Report of PCT/US12/56424; dated Nov. 30, 2012 (2 pgs.).
(Continued)

*Primary Examiner* — Tauqir Hussain
*Assistant Examiner* — Kamran Mohammadi
(74) *Attorney, Agent, or Firm* — DLA Piper LLP (US)

(57) ABSTRACT

A method and apparatus for the development, delivery and deployment of action-oriented business applications supported by a cloud based action server platform are provided. The cloud action platform enables the development, delivery and deployment of a new type of business application—Action Apps which are the opposite of traditional business applications which are large, expensive, viewed as an investment, hard to upgrade and oftentimes require training. The Action Apps are light-weight consumer friendly micro-apps that enable the business user to take the right actions, at the right time to produce the right business outcome. The action may be as simple as approving a vacation request, or it may trigger a series of more complex actions such as automatically discounting stock based upon competitors pricing within a specific radius in a given timeframe.

35 Claims, 13 Drawing Sheets

(56) References Cited

U.S. PATENT DOCUMENTS

| | | | |
|---|---|---|---|
| 2006/0200741 A1* | 9/2006 | DeMesa et al. | 715/500 |
| 2006/0293934 A1* | 12/2006 | Tsyganskiy et al. | 705/7 |
| 2008/0066145 A1* | 3/2008 | Molen et al. | 726/1 |
| 2009/0249446 A1* | 10/2009 | Jenkins et al. | 726/3 |
| 2011/0078243 A1 | 3/2011 | Carpenter et al. | |
| 2011/0208822 A1 | 8/2011 | Rathod | |
| 2011/0225232 A1 | 9/2011 | Casalaina et al. | |
| 2011/0270711 A1* | 11/2011 | Kusterer | 705/27.1 |

OTHER PUBLICATIONS

PCT Written Opinion of PCT/US12/56424; dated Nov. 30, 2012 (6 pgs.).

PCT International Preliminary Report on Patentability of PCT/US12/56424; dated Mar. 25, 2014 (1 pg.).

* cited by examiner

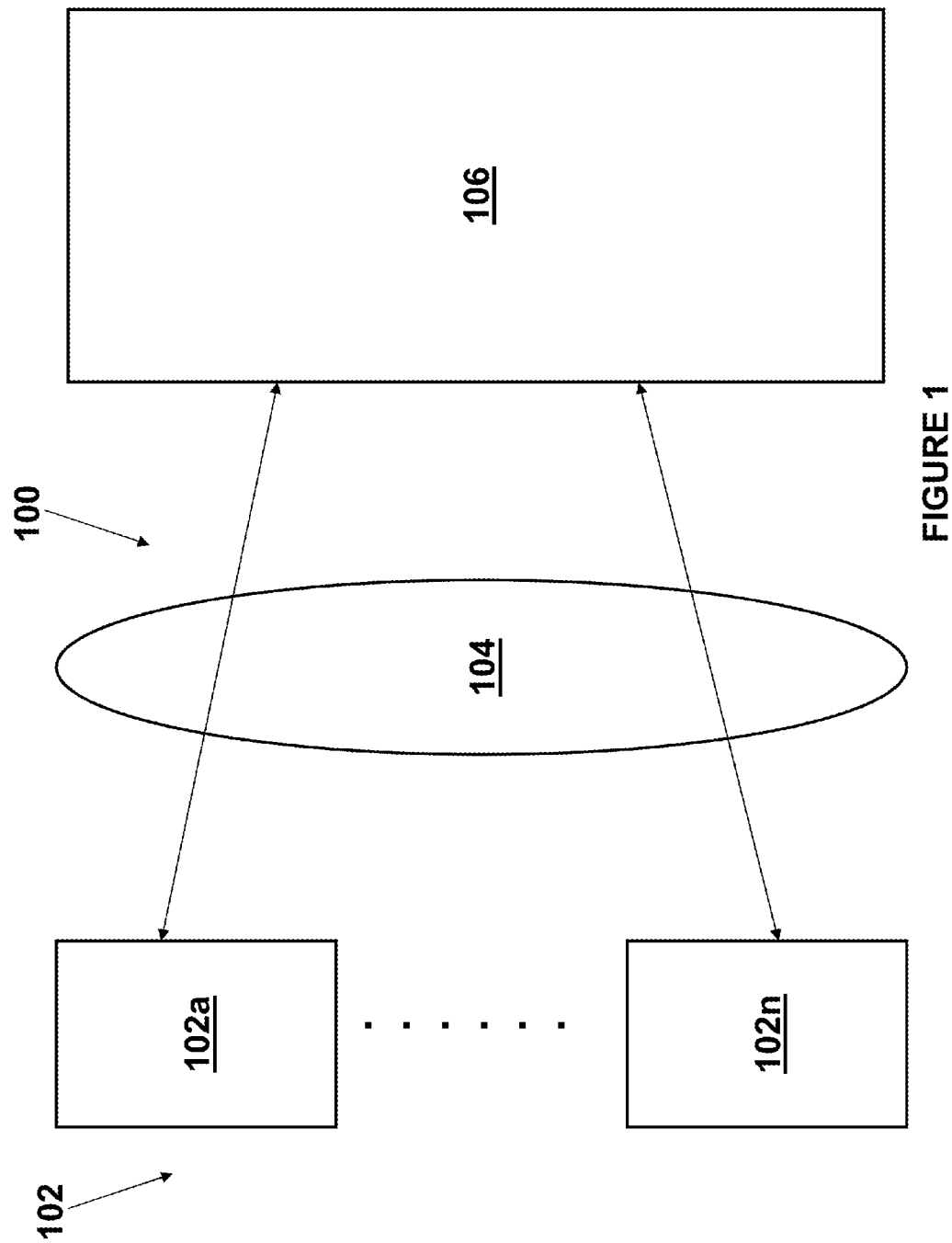

Example of what the Consumer interface could look like

METHOD AND APPARATUS FOR THE DEVELOPMENT, DELIVERY AND DEPLOYMENT OF ACTION-ORIENTED BUSINESS APPLICATIONS SUPPORTED BY A CLOUD BASED ACTION SERVER PLATFORM

PRIORITY CLAIMS/RELATED APPLICATIONS

This application claims the benefit under 35 USC 119(e) and 120 to U.S. Provisional Patent Application Ser. No. 61/537,571 filed on Sep. 21, 2011 and entitled "Method And Apparatus For The Development, Delivery And Deployment Of Action-Oriented Business Applications Supported By A Cloud Based Action Server Platform", the entirety of which is incorporated herein by reference.

APPENDICES

Appendix A is a PowerPoint presentation (3 pages) with example of the Action Apps; and Appendix B is a presentation (17 pages) with examples of the Action Apps.

The appendices form part of the specification and are incorporated herein by reference.

FIELD

The disclosure relates generally to a system and method for deploying software applications and in particular to a cloud based action server for the development, delivery and deployment of action-oriented business applications.

BACKGROUND

With the advent of the smart phone and accompanying application store such as the iPhone® and the AppStore® from Apple®, applications that can be downloaded from a remote store and used on a device are known and are used extensively. Generally, those applications are consumer focused applications which are light-weight and typically serve a single purpose. However, a system does not exist for the development, delivery and deployment of consumer-style action-oriented business applications that can be used to solve various types of business problems.

For example, the gasoline pricing for a supermarket chain is a business problem that could be solved by the desirable action-oriented business application. The business problem is that a major retailer with multiple stores sells gas but currently uses an Excel spreadsheet to set the selling price for the gas at each store. This spreadsheet takes in data feeds from a service that provides competitor pricing in the local area for each store and a feed from the nearest refinery to work out supply prices. The spreadsheet then uses some custom business logic to adjust the price to maximize the margin and communicates any price changes to both the ERP (which manages product prices) and the marketing team for changing the signage. The pricing team sometimes gets calls from a local retailer saying that the competitor has just changed its price, and requesting permission to also change the price. In the business problem, there are disparate data sources—some internal, some external, custom business logic to implement the analytics, actions require implementation through links to internal enterprise systems as well as other mechanisms such as email, and also that the solution needs to respond in real-time (or at least within minutes) to events within its environment. This business issue can be solved by action-oriented business applications.

Another example of a business problem is profit recovery through better supplier management in which a major retailer runs price promotions for various products all of which are funded by the supplier of that product. The retailer realizes that they have not been very diligent about invoicing suppliers for the costs of running these promotions and identifies that there is a potential of up to $20M that the retailer could recover from promotions run over the previous 6 years. To do this, the retailer needs to comb through sales and product data from their ERP, combine this with commercial discussions recorded only in an email archive, together with invoicing data stored as PDF's in a document repository. Once the analysis is completed, the retailer raises a claim for payment with the supplier. As with the other problems, this problem involves disparate data sources—ERP plus unstructured data, analytics that are used to identify suspect opportunities that then transition into a largely manual workflow—actions that require implementation through links to internal enterprise systems as well as other mechanisms such as email which can be solved by action-oriented business applications.

Another example of a business problem is reputation management in which a company wants to manage comments made about it in various online forums, like Twitter, Facebook, LinkedIn, blog posts, etc, in order to be able to identify negative comments and respond. Identifying these comments needs some analysis of unstructured text, and could also identify trends in commentary (e.g. highlighting product problems, or problems in a specific geographic area). This would include monitoring comments from employees too, to check compliance with corporate communication policies. The actions taken might include commenting on the original posts, directing people to a central area (e.g. company website) where a response to the issue has already been identified, identifying that multiple comments are actually from the same person and calling that person up and proposing a way to fix the problem (turning a complainer into an evangelist). As with the other business problems, the problem involves disparate data sources—some internal, some external, but many of which are unstructured and quite non-traditional—custom business logic to identify issues and trends, actions that require implementation through links to internal enterprise systems as well as other mechanisms such as email, and workflow processes that consist of many manual elements before the issue can be closed. This business issue can be solved by action-oriented business applications.

Another business issue is decision support for financial trading in which a hedge fund wants to store trades and price changes of securities, together with external factors such as world events associated with a company's home base, commentary about it on social networks, breaking news regarding accidents etc. All of these factors are taken into account in recommending a trading position in that security, going through a workflow process to adjust and approve that trading strategy, and then executing the trades needed to achieve that position. As with the above business issues, this issue involves disparate data sources—some internal, some external, but many of which are unstructured and non-traditional, custom business logic to identify issues and trends, actions that require implementation through links to internal enterprise systems, and workflow process that consists of a defined process of approvals etc before the issue can be closed. This business issue can be solved by action-oriented business applications.

Another business problem is student management for colleges and universities in which students are enrolled in a college, but are not able to choose which courses they want to attend, and what their communication preferences are. Based on their selection, allocation of appropriately-sized lecture rooms can be automated, students can be issued with the set of pre-requisites for the course (e.g. reading materials), advised of any changes to the rooms, have timetable entries added to their calendars, be given reminders when their GPS location is not close to the designated room—or else given directions to get to the room from where they are. Communications can be delivered via email, SMS, or Tweet. This problem again involves disparate data sources—mostly internal, custom business logic to react to events (e.g. change of room), actions that typically require implementation through links to internal enterprise systems, and communication via preferred mechanism of each student. This business issue can be solved by action-oriented business applications.

Yet another business issue involves location-based services in which customers sign up for alerts about retail offers based on their location such that whenever they are passing a shop with an offer available, they get alerted with details. This issue involves disparate data sources—location-based for customer and store locations, some internal (i.e. the set of offers and promotions), custom business logic to identify which offers to make to which customers, actions that require implementation through links to internal enterprise systems to track take-up of offers vs recommendations made, the need to react to events in real-time and the need to handle high-volume throughput of location updates. This business issue can be solved by action-oriented business applications.

Yet another business issue involves travel information alerts in which a traveler wants to be alerted when a change in travel plans changes—a flight is delayed, or there is an accident on your normal route to the airport, or your commute route. This issue also involves disparate data sources—mostly external, but many of which are unstructured and non-traditional and custom business logic to identify issues. This business issue can be solved by action-oriented business applications.

Yet another business issue involves customer service improvement in which a customer service rep needs to have a 360-degree view of all of a customer's interactions with the company when the customer calls in, including actions taken on the company website a couple of minutes ago, promotions and offers the customer has taken up, emails that have been exchanged with the customer, etc. If there is a problem with the service in the area in which that customer is located, then pro-actively tell them this. Data is used to figure out how to solve the customer's problem, and then take actions such as cross-selling a new product, changing the calling plan that customer is on, offering to refund or defer some costs they may have incurred, etc. This issue also involves disparate data sources—mostly internal, but may be unstructured (e.g. text mining of emails), a hard to automate analysis of issues without talking to customer, but can flag up most relevant items to the customer service rep, actions that require implementation through links to internal enterprise systems and a workflow process that consists of a defined process (e.g. obtaining approvals of proposed actions from supervisor) before the issue can be closed. This business issue can be solved by action-oriented business applications.

Thus, there are many different business issues/problems that can be solved by action-oriented business applications.

Some existing solutions attempt to solve the above business issues/problems, but none of the existing solutions fully solve the problems/issues.

Thus, it is desirable to provide a cloud action platform that delivers action oriented applications to business users that brings the same level of productivity and user satisfaction that exists in existing consumer applications, and it is to this end that the disclosure is directed.

BRIEF DESCRIPTION OF THE DRAWINGS

FIG. 1 illustrates an example of a system that implements the cloud action platform;

DETAILED DESCRIPTION OF ONE OR MORE EMBODIMENTS

Figure 2A:
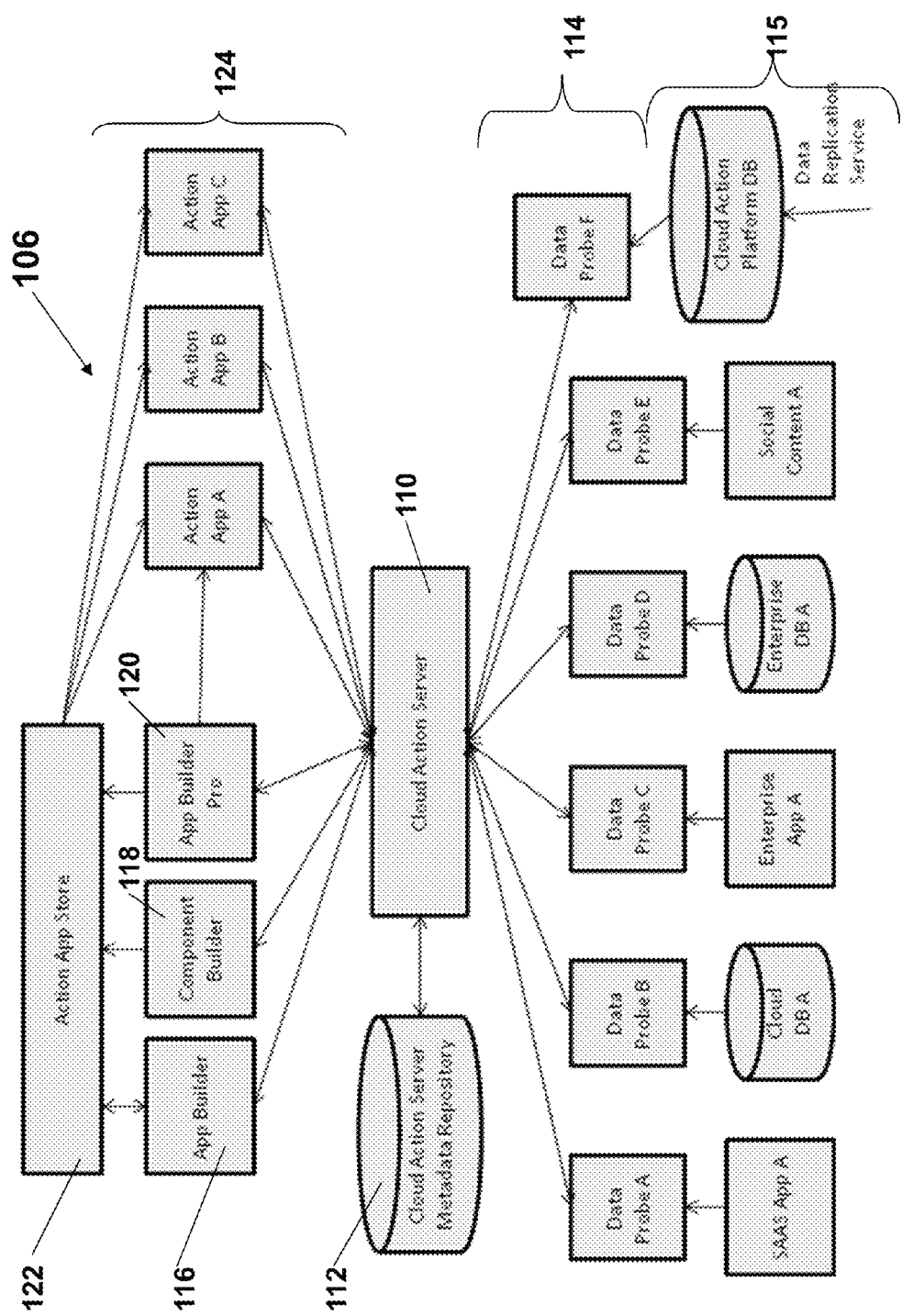
FIGS. 2A and 2B illustrate more details of the cloud action platform.

The disclosure is particularly applicable to a cloud based action app platform as described below and it is in this context that the disclosure will be described. It will be appreciated, however, that the system and method has greater utility since it can be implemented in other manners and with other features that are within the scope of the disclosure.

The Cloud Action Platform enables the development, delivery and deployment of a new type of business application—Action Apps. Action Apps are the opposite of traditional business applications which are large, expensive, viewed as an investment, hard to upgrade and oftentimes require training Action Apps are light-weight consumer friendly micro apps that enable the business user to take the right actions, at the right time to produce the right business outcome. The action may be as simple as approving a vacation request, or it may trigger a series of more complex actions such as automatically discounting stock based upon competitors' pricing within a specific radius in a given timeframe.

The bottom layer of the Cloud Action Platform consists of a series of data probes, and/or a data platform, that probes a wide variety of data domains e.g. a Twitter stream, an ERP system, streaming real-time financial data, video streams etc. to detect changes to data. The list of data domains being probed will vary depending on the Action Apps being supported. The data domain into which the probe is inserted could be on-premise or in the cloud. The data probes are constantly identifying specific data events. These events are determined by the actions specified in the Action Apps for a particular deployment. For example, there may be an Action App which is set to trade a specific stock when it reaches a certain threshold but only if the Twitter sentiment for that corporation is at a particular level. The system would have data probes in the stream of stock trading data, and a probe in a Twitter sentiment data source. The probe in the stock trading stream would be monitoring trades of that stock and would trigger when the specific price was observed; the probe in the Twitter sentiment feed would then retrieve the sentiment value for the corporation and if both thresholds were met, the Cloud Action Server, the next layer in the Cloud Action Platform, would fire a trigger that would notify the Action App which would subsequently prompt the user to make the trade, or could perform it automatically. The data probes will also be capable of searching rich contexts, such as a multi-media e.g. a data probe could be set to perform facial feature recognition on a real-time camera feed. In addition, the data probes can return value sets rather than simple triggers. For example, the probe result might be a video sequence with statistical parameters.

The Cloud Action Platform will provide a simple interface through which business users will be able to build their own Action Apps based upon data domains made available to them by the Cloud Action Platform. The data domains made available to a particular user may depend upon their role in the organization so that sensitive data can be protected. The Cloud Action Platform will provide the ability to publish Action Apps, and Action App components (data sources, triggers, actions), in an Action App Store which may be private to the enterprise, or published to a publically available store.

The Cloud Action Server is a new layer in the software stack and is unique to the Cloud Action Platform. The Cloud Action Server enables the action logic to be separated out from the application workflow. The Cloud Action Server can be deployed in a public or private cloud, and can have an integrated cloud management framework for deployment in either environment. The Cloud Action Server encapsulates all of the Action Logic which ranges from the definition of the data domains on which the actions depend, to the thresholds and values that trigger the actions, to the action definitions and the actual triggering and execution of those actions. Action logic may also encompass describing classes of action types, the ability to perform transformations (Boolean logic and other) and then codifying a set of activities (say a business function) into action flows, action decision points and from there to action interactions which become Action Apps. This paradigm is highly useful for re-thinking any action intensive process, procedure or function. The business process flow charts in use today force a sequential logic rather than an asynchronous action-oriented (computing) logic that is possible with the Cloud Action Platform.

Once a user has logged into the action app platform, the user sees a list of Action Apps that the user has already created. In the user interface, the certain of the Action Apps may have red notification badges on them to show that these specific action apps have generated an alert (the action of the action app) that the user has not yet read. The user interface also allows the user to turn individual apps on or off (e.g., activate or deactivate the action apps and the trigger events associated with the action apps.) For example, the user wants to create a new Action app because, at the end of a quarter, there are cases where Opportunities for the NEMEA Professional Services team in SalesForce are slipping from this quarter to next quarter without the manager noticing and the user would like to be alerted when this event happens. Thus, after giving the new Action App a name, the user can choose SalesForce Opportunities as the main data source for the new Action App. If that particular data source has not yet been unlocked (e.g., because the user has not yet provided login credentials for that data source), then the user goes through a process to set up an email address and PIN for the app and get directed to Salesforce to provide login credentials to allow the Action Apps to access the data. Once the data source is unlocked, the user can pick 'Forecast Period' for a user interface as the field to watch/monitor (the trigger event.) The user (a professional Services Manager in this example) then decides specifically what they want to be alerted about, and, in one example, chooses a change from 'this' quarter to next quarter as the main event to monitor. The user then select an alert setting (i.e. email me which is acceptable to the user in this example) and other 'richer', more complex options are also available. The user may then filter out events that they don't want to know about so they can make sure to only include 'Opportunities for my region', Northern EMEA, and only include changes where the forecast probability is quite high, 60% and 90%; whereby all others will be ignored. The user can then save the Action App and it will run by default every 15 minutes (though this could have been changed by tapping a clock icon next to the App name).

The platform also has a simple user interface (partially described above) that allows a user to build and potentially publish their own Action Apps on their mobile device will be unique to the Cloud Action Platform. This interface will be built with one of the tools described above but it will be purpose built exclusively for the definition and publication of Action Apps. The Cloud Action Platform uniquely provides the ability to publish Action Apps to an Action App Store. Action Apps and Action App Components may be published to a public Action Apps Store, or enterprises may choose to host a private store where Action Apps and Components would be available for internal consumption only.

The Cloud Action Platform is designed to take input feeds from disparate data sources (both structured and unstructured data, and both internal and external data sources), each of which are organized into 'Data Domains' such as Sales, HR, Finance, etc in order to make them easier for a business user to understand the context. Data Domains can be supplied by the Cloud Action Platform, or created by the user themselves. Upon these data sources, 'triggers' are then defined which will fire when a set of conditions is met—such as when a forecast value drops below a specified target. When this event happens, an action should take place, such as sending an email to someone, or calling a web service based on parameters derived from the triggering event.

Within both the Trigger functions and Action Functions described below, algorithms may be included that are able to automate or "recommend" new triggers, trigger levels, and Actions based upon historic trigger, trigger level and action outcomes. This would include predictive trigger, trigger level and Action functions. Trigger processes also may include the ability to process image or algorithms or processes e.g., pattern recognition against data streams (probes) together with Asynchronous matching (match=trigger) against data repositories e.g., facial recognition from CCTV matched against data file of facial records.

Figure 12:
FIG. 12 illustrates an example of a recommendation user interface of the Action App.

For example, the system may use recommendation engines to recommend an application, action or trigger to a user based on the other applications used by the user or based on usage data from other users. FIG. 12 illustrates an example of how a recommendation user interface is integrated with Action Apps 240. As shown, the recommendation user interface may be added to the standard action interface to extend the actions available to the user. In this example, a community button is present to provide recommendations from an area of interest. By tapping this button, the Action App would access the Cloud Action Platform server to access a recommendation engine to present another set of actions derived by the engine.

The action processes may include generating output data streams either independent from the input data streams or based on the input data streams (standalone or combined) or additionally enhanced. These enhancements would be provided by libraries of Action enhancement functions. An example of an implementation of the Cloud Action Platform is described in more detail below.

FIG. 1 illustrates an example of a system 100 that implements the cloud action platform. The system has one or more computing devices 102, such as computing device 102a to computing device 102n as shown in FIG. 1, that connect/interact over a link 104 with a cloud action platform unit 106. Using the computing devices 102, a user can develop, deliver, deploy and use/interact with a new Action App by interacting with the cloud action platform 106 and the action app has the capabilities that are desired by the user. Each computing device may be a processing unit based device with sufficient memory, display capabilities, speed and connectivity (wired or wireless) to interact with the cloud action platform 106. For example, each computing device may be a smartphone device (for example, an Apple iPhone, a RIM Blackberry, Android operating system based device, Nokia, etc.), a tablet device (for example, an Apple iPad or other tablet devices), a laptop computer, a personal desktop computer, a Windows mobile operating system device and the like as the cloud action platform is not limited to any particular computing device since the cloud action platform may be used with various different computing devices. The link 104 may be a wired or wireless link such as an Ethernet connection, a WiFi connection, a cellular data network, a computer network and the like. The protocols used for the action app system may be standard transport protocols, such as HTTP, FTP, XML, SOAP etc. The cloud action platform 106 may be one or more server computers with the usual server components that execute a plurality of lines of computer code to implement the various modules, servers, etc. of the cloud action platform 106. In one embodiment, the one or more server computers may be in the "cloud" meaning that the company that operates the cloud action platform 106 rents/leases the hardware from a cloud computing company.

Figure 2B:
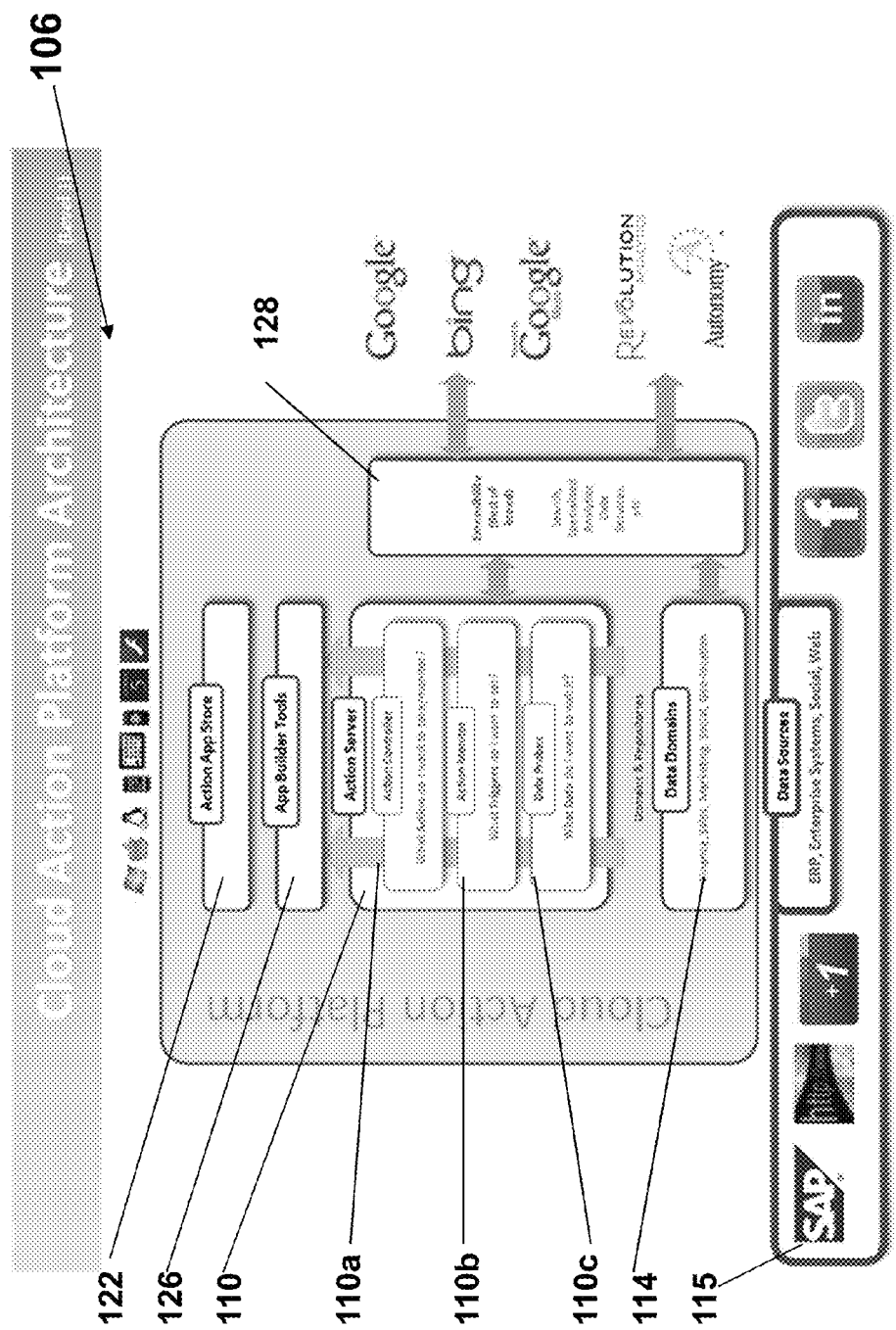
Figure 7:
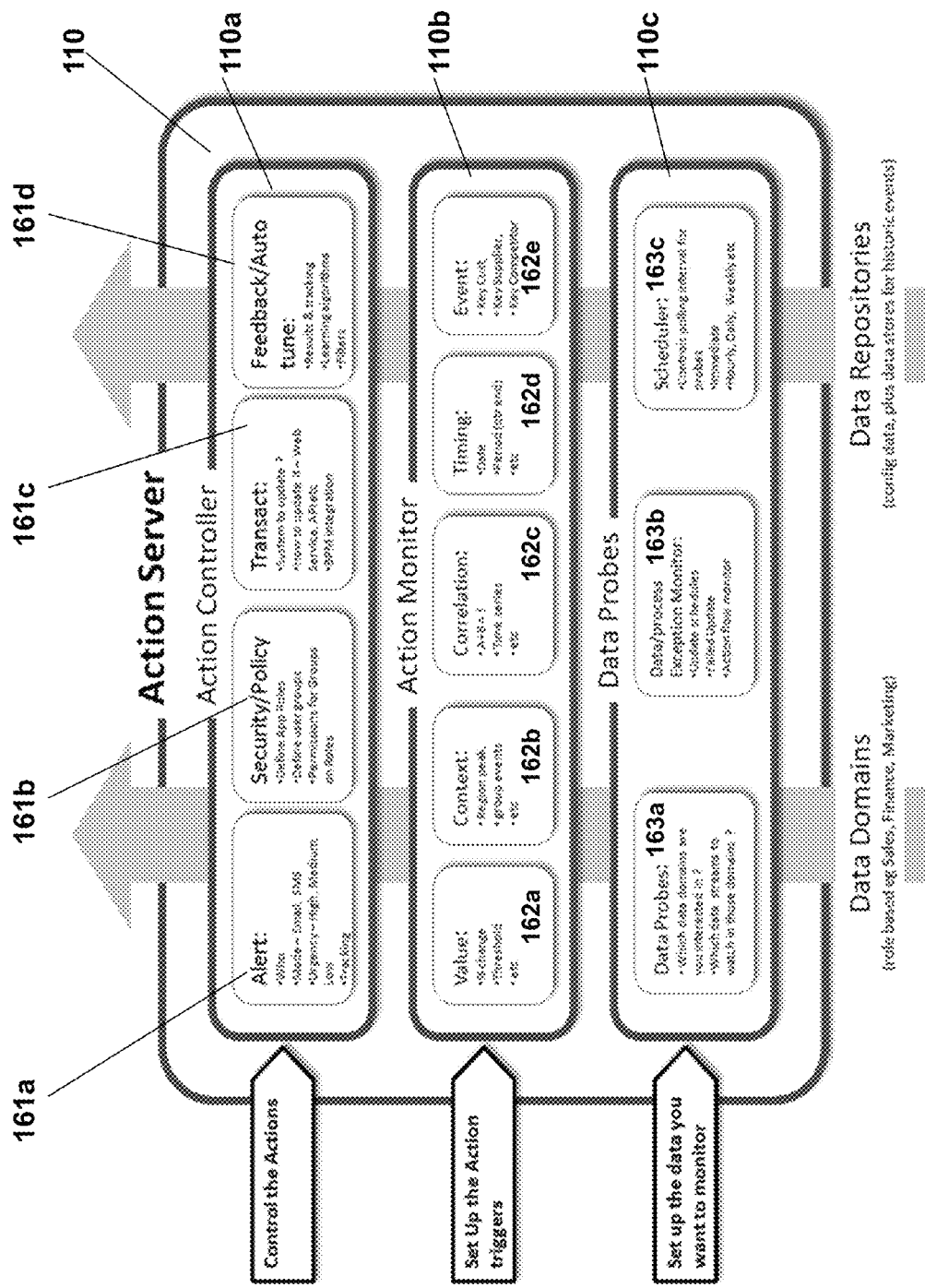
FIG. 7 illustrates more details of the action server of the action app platform.

FIGS. 2A and 2B illustrate more details of the cloud action platform 106. The platform 106 may have a cloud action server 110 (described below in more detail with reference to FIG. 7), a cloud action server metadata repository 112, a set of data probes 114 (such as data probe A, . . . , data probe F) each of which is connected to a data source 115 (such as SAAS App A, Cloud DB B, Enterprise App A, Enterprise DB A, social content A and a cloud action platform database which provide a data replication service), an App builder 116, a component builder 118, an App Builder Pro 120, an Action App store 122 and one or more action apps 124 generated and deployed by the platform (or used by a user). The detail of each of these elements of the cloud action platform 106 are described below in more detail. In one implementation, each unit/module of the cloud action platform 106 may be a plurality of lines of computer code that may be executed by a processor of computing resources, such as cloud resources, to implement the unit/modules described below. In other implementations, each unit/module may be hardware or a integrated circuit with code that implement each unit/module. As shown in FIG. 2B, the platform 106 may further include a software development kit (SDK) 126 and extensibility units 128 that allow the platform to interact with various other search engines, specialized analytics, data services and the like. The cloud action server 110, as shown in FIG. 2B, may further comprise an action controller 110a (to allow a user to determine what actions the user is going to take or monitor), an action monitor 110b (to allow the user to determine the triggers to set), and one or more action probes 110c (that allows the user to select the data to be watched).

In one embodiment, the action Apps will typically be deployed on mobile devices such as smart-phones and tablet computers such as iPhones and iPads. To access the Action App, the user will visit the Action App Store 122 and download and install the Action App 124 or Action App Builder 116 to their computing device 102. The user will then invoke the App Builder 116, which enables the user to set the values and thresholds for various triggers, on the mobile device (an example of the user interface of which is shown in FIG. 5). Once the trigger is set, the Action App will run in the background on the device waiting for a notification from the Cloud Action Server 110 that the trigger has fired. Once the trigger is fired, the Action App will perform whatever Action has been specified—this may be to send a push notification to the user that an event has occurred, or may be an automated action such as invoking a web service.

The App Builder Pro 120 and Component Builder 118 will typically be deployed on a laptop or desktop computer. The Component Builder 118 is used to define and build components for use within the App Builder Pro. The Component Builder 118 can publish Components to the Action App Store 122. The App Builder Pro 120 is a point and click interface that allows a User to build Action Apps and publish them to the Action App Store 122.

In one embodiment, the Cloud Action Server 110, the Cloud Action Server Metadata Repository 112 and the Cloud Action Platform DB 115 may be cloud based. These components can run in a private or public cloud, or where necessary may be split between public and private clouds e.g. if there were security or performance concerns relating to placing the Cloud Action Platform DB in a public cloud. While the Cloud Action Platform in one implementation may be software and a Software as a Service solution, other implementation of the Cloud Action Platform may be a hardware appliance with integrated cloud management. While data sources accessed by the Cloud Action Platform can be accessed in-situ, there may be instances in which it makes more sense to replicate the data to the Cloud Action Platform Database e.g. to perform analytics on transactional data without impacting the transactional system. The data probes 114 will typically be co-located with the information source they are probing. These may be on premise, in the cloud, or elsewhere. The data probes will be monitoring the information sources for specific events and will notify the Cloud Action Server 110 when those events occur.

Figure 3:
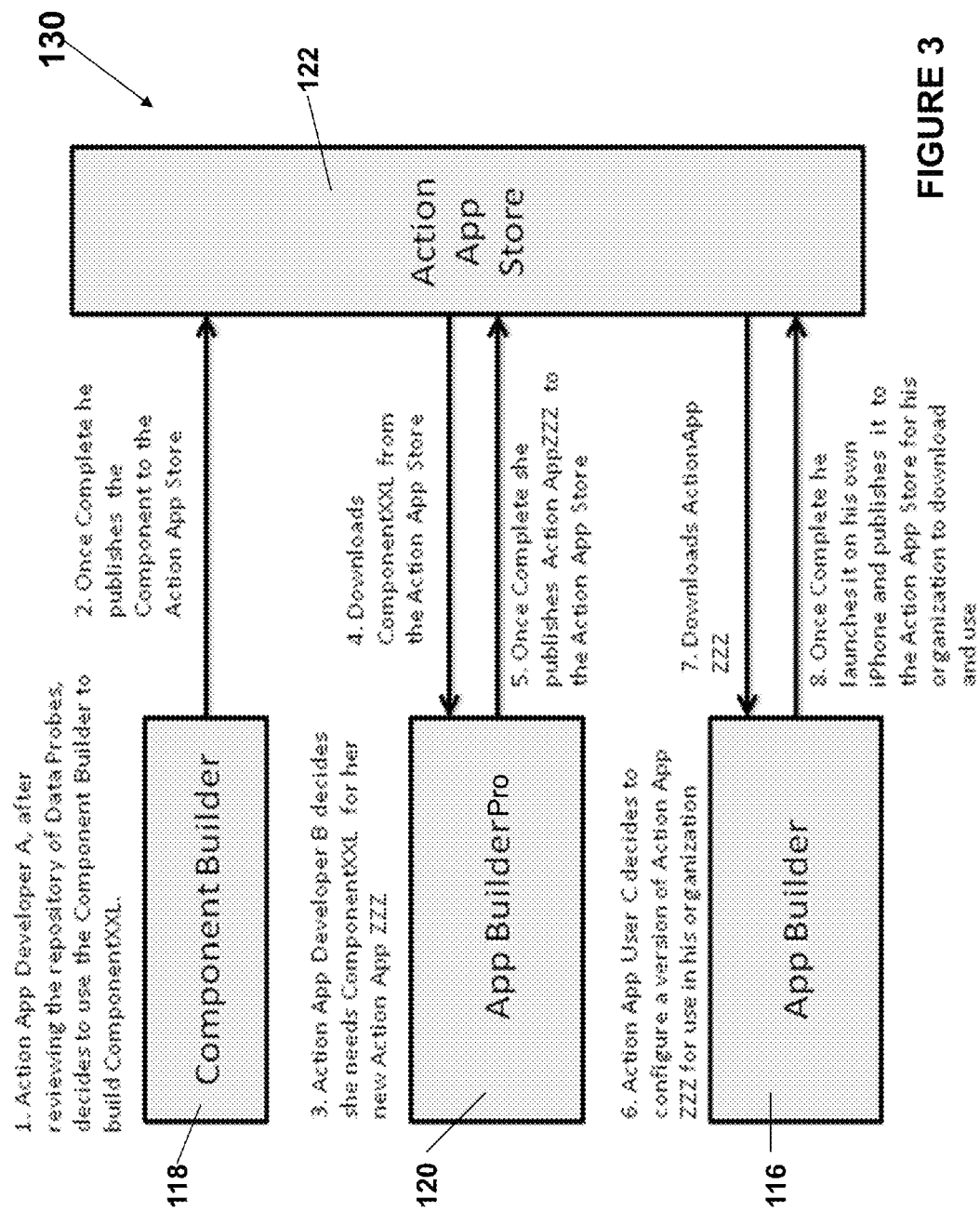
FIG. 3 illustrates a method for development, delivery and deployment of an action app using the system in FIGS. 1-2B.

FIG. 3 illustrates a method 130 for development, delivery and deployment of an action app using the system in FIGS. 1-2B. In the process, Action App Developer A, after reviewing the repository of data probes, decides to use the Component Builder 118 to build ComponentXXL (1). The developer then publishes the component to the Action App Store

122 (2). Action App Developer B decides that ComponentXXL is going to be used with a new Action App ZZZ (3). The developer downloads ComponentXXL (4) from the Action App Store and then uses the App Builder Pro 120 to develop Action App ZZZ. Once Action App ZZZ is completed, the action app is published (5) to the Action App Store 122. Then, Action App User C decides to configure a version of Action App ZZZ for use in his/her organization (6) and, using the App Builder 116, downloads the Action App ZZZ from an Action App Store 122 (7). Once the customization is complete, the user launches the Action App on the iPhone and publishes the configured App to the Action App Store 122 for the organization to download and use (8).

For example, a developer could create a component to make it very easy to make a call into SAP to get a specific type of data out—e.g. Sales data—by wrapping the Web Services API with the specific calling sequence required to get this data set out of SAP. They could then publish this component to an Action App Store and a developer could then develop an Action App, within App Builder Pro, which notifies the Sales VP via email when a sales rep's confidence in a deal closing falls below a certain threshold. The Sales VP may download the SAP Sales Data Probe from the Action App Store to enable his Action App to access the necessary SAP sales data. The Sales VP can then publish this Action App to an Action App Store. The head of sales for a given organization could then download this Action App and set the confidence threshold for his organization to a certain level and then push that out via an Enterprise Action App Store to all the Sales VPs in his organization.

Figure 4:
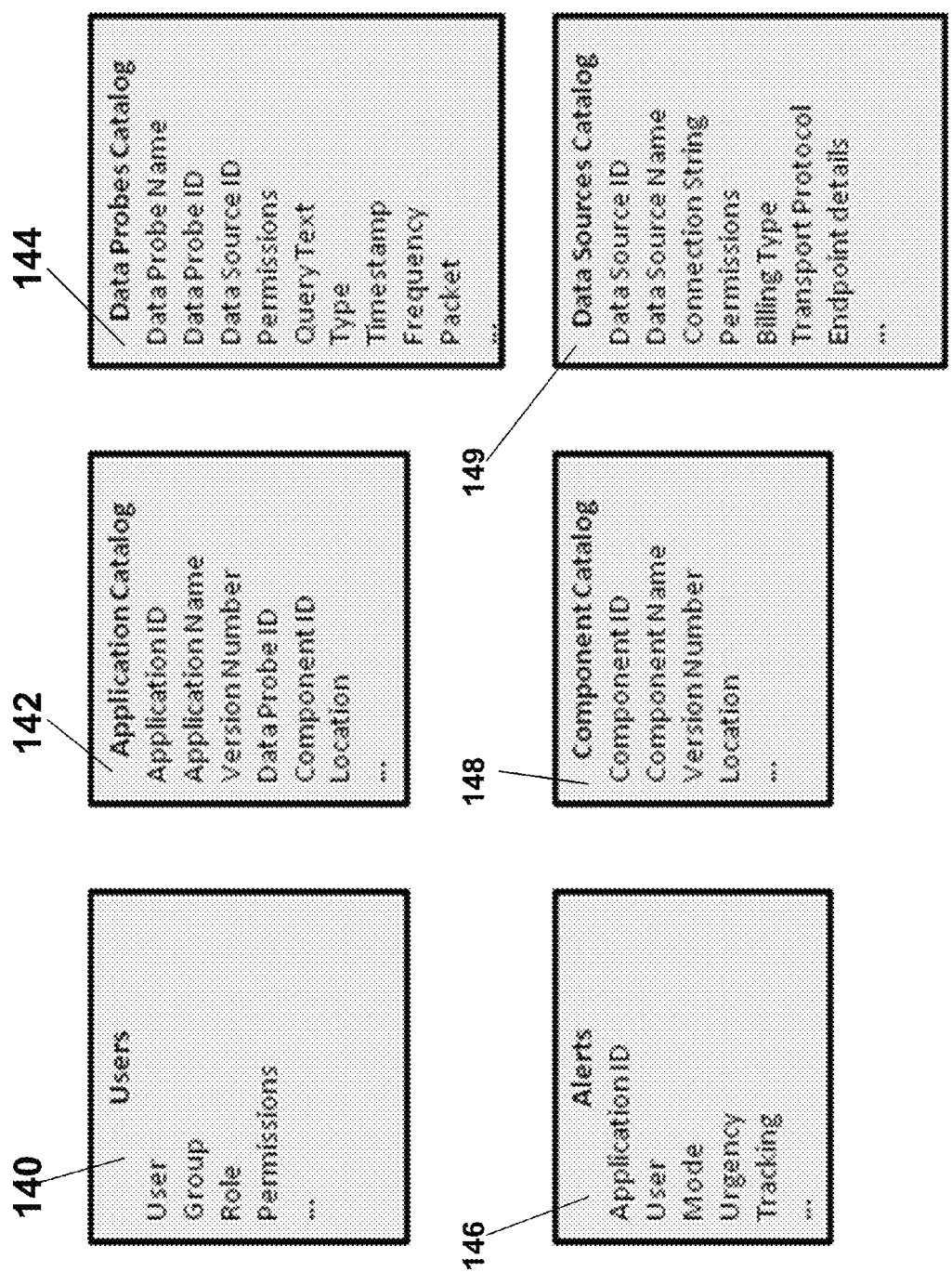
FIG. 4 illustrate an example of the database schemas for the system in FIGS. 1-2B.

FIG. 4 illustrates an example of the database schemas for the system in FIGS. 1-2B. The database schema may include one or more user records 140, one or more application catalog records 142, one or more data probe catalogs 144, one or more alert records 146, one or more component catalogs 148 and one or more data source catalogs 149 that each contain the data fields as shown in FIG. 4. The system and method may contain additional records and field not shown in FIG. 4 that would be within the scope of the disclosure.

Figure 5A:
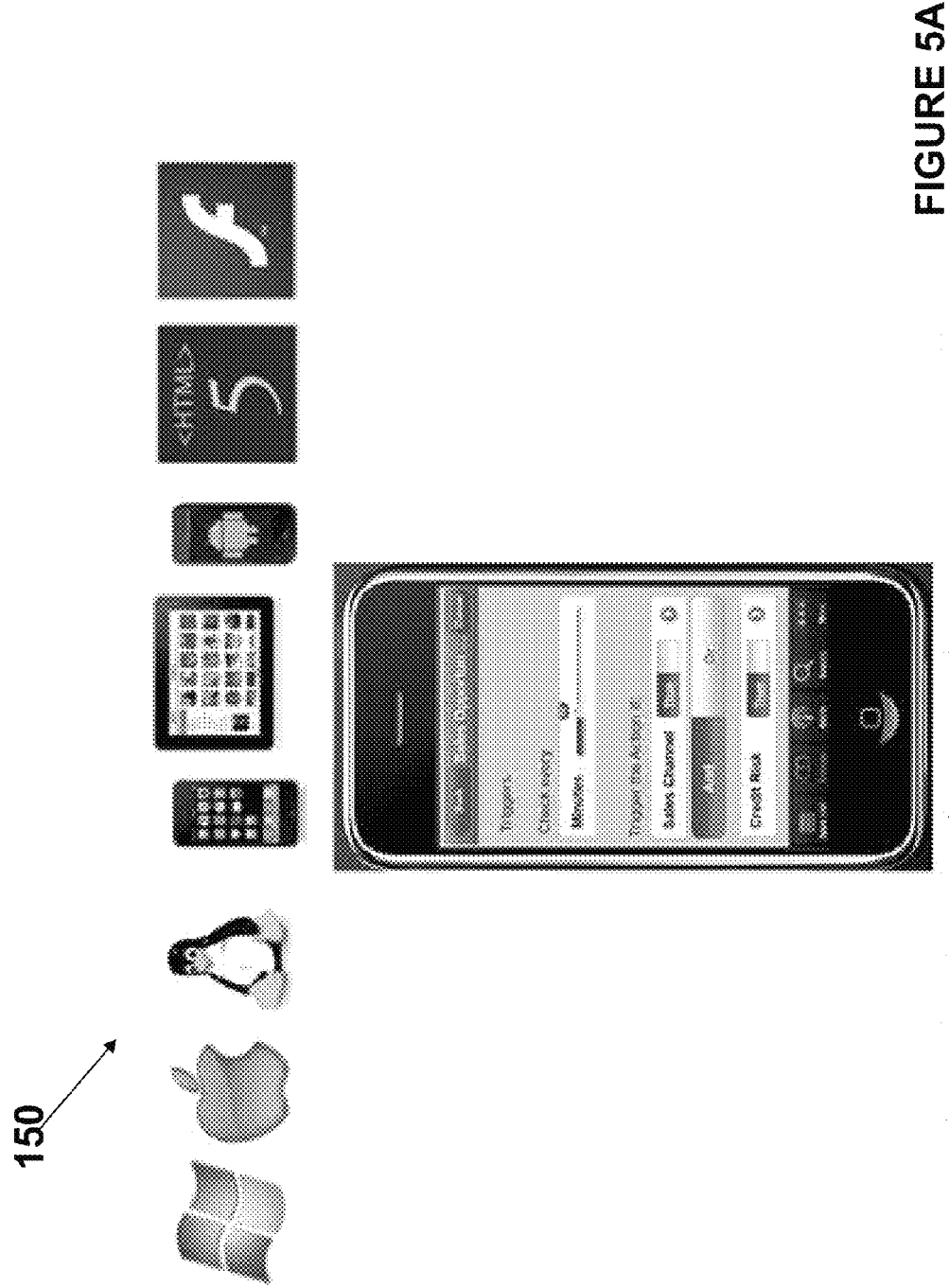
FIGS. 5A and 5B illustrate an example of a user interface of an action app.
Figure 5B:
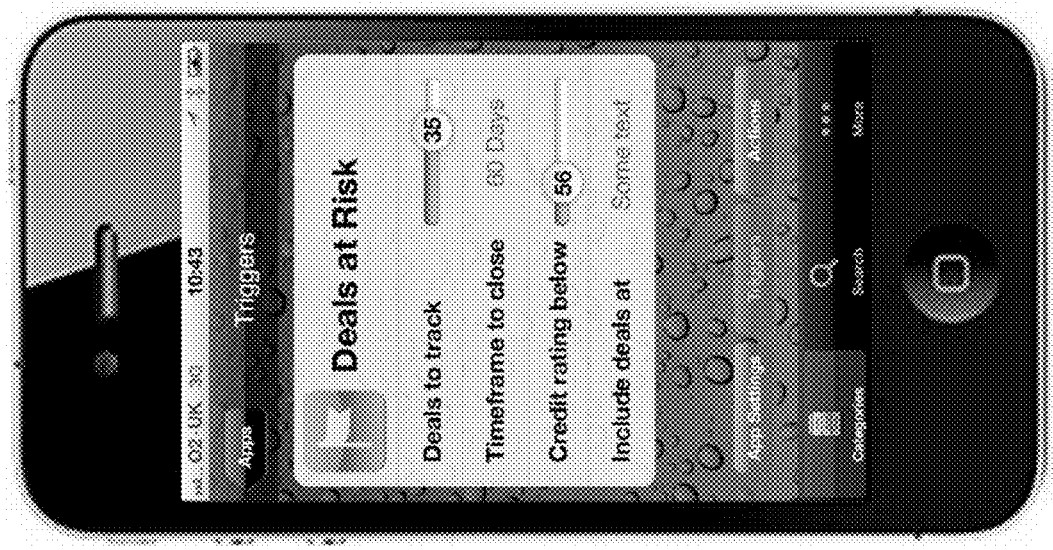

FIG. 5A illustrates an example of a user interface 150 of an action app. The system has a user interface layer provided: It includes an interface for consuming apps (see FIG. 5A for example) and one for creating them (as example of which is shown in FIG. 5137) This user interface also works within a web browser but the consumer apps also needs to support a wider set of platforms than just a browser such as the apps interface in a device like the iPhone as is shown in FIGS. 5A and 5B.

In addition to the user interface, the system may also have a third level of developer interaction with the platform: that of the component developer, who puts together the pieces that are consumed by the other two user types. This type of interaction will typically be through an IDE against a class library that we supply, or a separately supplied SDK, rather than having a hosted UI within the platform.

The consumer user interface's key function is to personalize and configure the parameters for an app, request input from the user and to display output (whether textual or graphical) (shown in FIG. 5). The business and process flow logic is not contained in the app—instead that is resident on the Cloud Action Platform. One common set of user interfaces will be typical BI tools, which will largely ignore the business and process flow logic within the platform, and connect straight through to the underlying data source.

The system will support common web browsers (e.g., Internet Explorer, Firefox, Chrome and Safari), and that this set will provide the broadest platform coverage including as a lowest-common-denominator option to mobile devices. Beyond this, apps will be available to specific computing devices, such as Apple and Android. This will be accomplished by providing an app for each platform as a 'container' and rendering engine, that takes the definition of an app from the platform and renders it onto the target device and form factor (screen size and resolution etc). Under this model, the Action App developer does not also need to be an iOS and Android developer too. Apps created for the platform will be available on every supported platform automatically, without the app developer needing to do anything to enable this, other than paying attention to form layout issues when creating their app (to ensure it would be usable on a small screen). In the system, it is possible that some Apps may not require a user interface: in many ways the point of what we are delivering is that Actions just happen in the background without the user needing to log on and 'do stuff' to implement that action. In Use Case #1 for example, gasoline price changes will happen automatically when the environment changes—no user needs to log on and 'make it happen'—they only do this when they want to change the parameters of the business logic.

Figure 6:
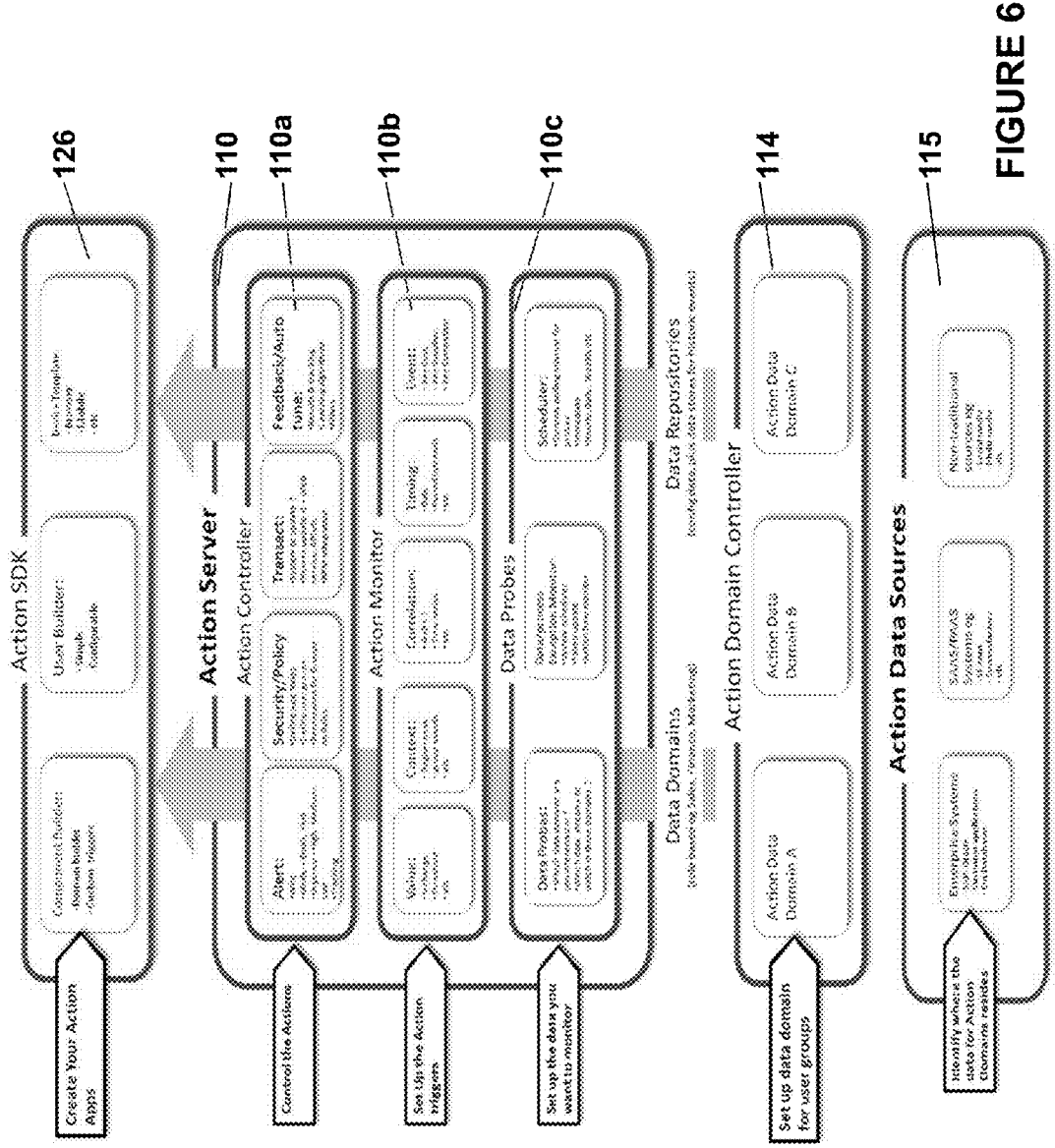
FIG. 6 illustrates more details of the action app platform of the system.
Figure 8:
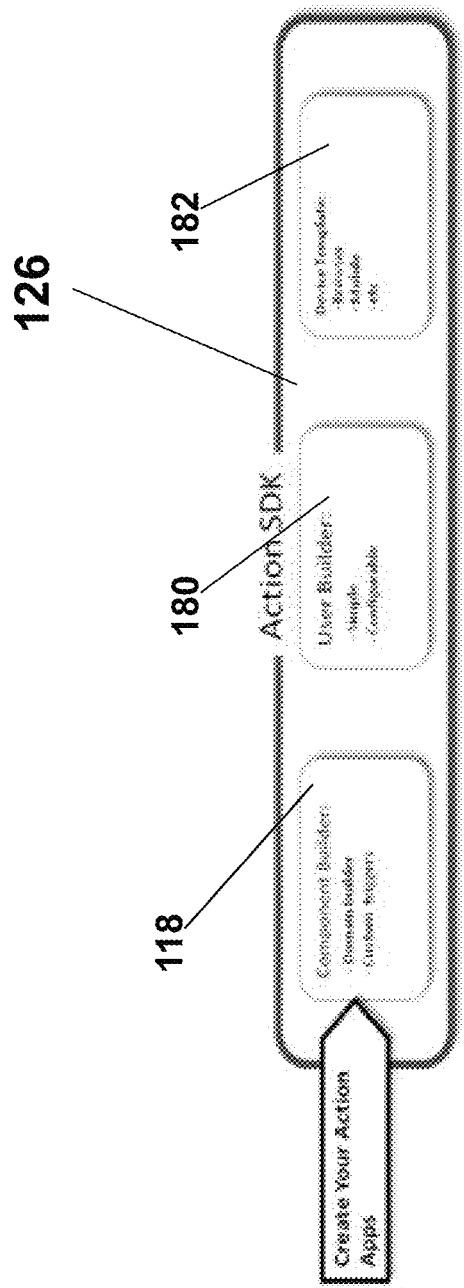
FIG. 8 illustrates more details of the action SDK of the action app platform.

FIG. 6 illustrates more details of the action app platform of the system including the action SDK 126, the action server 110 (and its sub-components), the action domain controllers and the action data sources 115. The Action SDK 128 (also shown in FIG. 8). The SDK 126 has the component builder 118 described above, a user builder 180 that allows the user to create a user profile that is configurable and a device template store 182 that stores the various templates for the different browsers, the different computing device and the like.

The action server 110 (shown in more detail in FIG. 7) encapsulates all of the Action Logic which ranges from the definition of the data domains on which the actions depend, to the thresholds and values that trigger the actions, to the action definitions and the actual triggering and execution of those actions. The action apps will be supported by a robust and secure Cloud Action Platform with the Action Server 110, at the heart of this platform, will be responsible for managing, delivering and coordinating Events. An event is any occurrence that your Action App is designed to handle e.g. it could be that a certain data item has been observed in a data stream. Events will be communicated to the Action Apps and fire a trigger which in turn will prompt an action.

The action server 110 has an action controller 110a and the action controller controls the actions to be taken by the apps. In particular, the action controller 110a will gather meta-data and statistics about how often events are triggered and what Actions take place. Based on this data set, learning mechanisms can be created which will spot patterns of correlation between events and between actions. These patterns can be used to fine-tune Action Apps, and help to filter and prioritize Actions. The action controller 110a has an alert portion 161a that gathers and store data about each alert including the who (subject of the alert), mode of communication of the alert (e.g., email, SMS or MMS), urgency of the alert (e.g., high, medium or low) and tracking of each alert. The action controller 110a also may have a security/policy portion 161b that defines and stores App roles, user groups and permissions for groups on roles, a transact portion 161c that sets the update times, how to perform an update (web service, API, etc.) and BPM integration and a feedback/autotune portion 161d that gathers and stores the results and tracking, one or more learning algorithms and one or more filters.

The action monitor 110b sets up one or more triggers for each action. In particular, the action monitor is the mechanism that matches the results from Data Probes against the configuration parameters of Action Apps and decides whether anything needs to be done. Typically events will be triggered based on changes to the result set returned from a Data Probe. However, there will be various ways to control how significant a change must be to trigger an event: perhaps any change at all should trigger, or perhaps only a change of more than 5% within the last week, or perhaps only when a Data Probe exceeds a certain absolute value. The Action Monitor will have a sophisticated understanding of time so that event correlations over time can be used as triggers (e.g. only trigger an event if both A and B happen within 5 minutes of C). Furthermore, formulae can be used to allow for Boolean combinations of events to be set up (i.e. AND, OR, and NOT conditions), and for events to be triggered based on calculations (e.g. only trigger an event if the profit margin of a deal falls below a target threshold, where profit margin is calculated on the fly). For complex event models, it may become necessary to have events create other events automatically, which then propagate back into the event model. The action monitor 110b has a value portion 162a that stores a percentage change, threshold and the like that can be used to set up a trigger for an action, a context portion 162b that gathers and stores a region peak, group events and the like, a correlation portion 162c that may be a formula, a time series and the like, a timing portion 162d that stores a date, a period (quarter end), etc. that may be used to trigger an action, and an event portion 162e that stores KeyCust, KeySupplier and a KeyCompetitor.

The data probes 110c set up the data that the user wants to monitor. A data probe, at its simplest, consists of a query run against a data source. The data probes can be either Real-Time, or Scheduled. Most data probes will be run on a schedule, and evaluated as frequently as needed (e.g. some probes would only need to be evaluated on a daily or weekly basis, but the default schedule would be to evaluate a probe every 5 minutes). Examples of the Action Apps (with triggers) are shown and described in further detail in Appendices A and B which are incorporated herein by reference.

Real-Time probes provide the ability to react more quickly to events as they happen, or to gather aggregated statistics over a series of events that happen rapidly. For example, a stock price might change several times a minute, but if your data probe only wants to know if the price has broken through a threshold at any point during that time, this would be hard to measure if you only sample the data once every 5 minutes. In another example, a data probe might be scanning a live camera feed at a soccer stadium to identify known football hooligans by matching facial features. Using the App builder Pro interface, it will be possible to create new composite data probes that pull together information from a number of different data sources and data domains. For example, you may want to pull data from the Sales Domain and from the Social Domain, but expose the control parameters within the Action App as a single Data Probe to simplify configuration for the end user. A Data Probe therefore needs to abstract and normalize the key elements of the data being monitored in a consistent way, to allow a probe to be monitored by an Action App whatever the underlying data source. Key normalized items of data per probe include security and permission information, date/time stamp, data source name and domain name, and a formatted packet of data (e.g. XML or JSON format).

The data probe will also have a robust mechanism for dealing with security authentication and authorization requirements. These functions will be delegated from the user that is running the Action App that the Data Probe is working within, so that the data returned by the Probe is specific to the user that is running the Action App. The security credentials store will be located within the Cloud Action Platform, but managed by the Action App user interface.

The data probe 110c may further comprise data probes 163a that are data domain specific and data stream specific within a data domain, a data/process exception monitor 163b that updates schedules, tracks a failed update and has an action flow monitor, and a scheduler 163c that controls the polling interval for each probes and can be immediately, hourly, daily, weekly and the like. Additionally, instead of a data probe, the Action Server can receive triggering events from a data platform that can detect changes to data, and return events directly to an application tier. In this scenario, the Action Server will only receive events and do no direct processing of the data.

The action domain controller 114 is a management tool which makes it easy to tag, categorize and search data sources in order to find the most appropriate service for the Action App Developer's needs. The Action App Developer will select the Action Apps they want to work with, which will be dependent on a number of Data Probes, Domains and Data Sources. The Domain Controller will provide the mechanism for managing these dependencies. When creating a new Action App, the meta-data stored by the Action Domain Controller in the Cloud Action Server Metadata Repository would be used to help the Action App Developer find and configure the Data Sources the Developer needs for his or her Action App.

The action data sources 115 are the data sources of the Cloud Action Platform that can span a wide range of technologies, including both structured and unstructured sources, and also sources that are both internal to and external from an enterprise. Many Data Sources will generally have a number of characteristics in common, such as:
  Set of services supported by the Data Source
  Parameters required by each service
  Description of the data format returned from each service
  Security requirements for being able to call the service
  Billing characteristics for the service
  Endpoint details for the Data Source (e.g. HTTP addresses and port numbers)
  Transport protocol required (e.g. HTTP, FTP, XML, SOAP etc)

In this way, a single Data Source can support both query services to gather data, and also update services to make changes. The query service may have more open security requirements than the update service, but in general the Cloud Action Platform will simply pass through the security credentials for the user of the Action App to the end service, or use standard authentication methods, which will be responsible for validating credentials against the service to see if that user is able to perform that operation or not.

The Data Source layer needs to be able to both replicate an enterprise database efficiently into the Cloud Action Platform (and keep it up to date with changes happening over time), and also to execute queries against data sources where the bulk of the data is held outside of the Action Server's data repository. To ensure the timely delivery of events, data changes will have to be replicated in near real-time.

Data Sources supported will include the most popular enterprise database servers, on-premise and SAAS ERP and CRM systems, as well as popular technology interfaces, and a set of pre-packaged utility and look-up services from public data providers:

Enterprise Databases: Ingres, Oracle, SQL Server, Microsoft Access, Sybase, DB2, Informix, MySQL, PostgreSQL, and other via ODBC and JDBC interfaces.

Technology Interfaces: Web Services, XML, XBRL, RSS, ODBC, JDBC, Excel, Flat files, Email, and SMS.

ERP and CRM Apps: Oracle, SAP, Oracle eBusiness Suite, Salesforce, JD Edwards, PeopleSoft, Microsoft Dynamics, Infor, Lawson, BMC Remedy and AMDocs.

Public Data Sources: Utility services such as geo-coding or verification of addresses from services like StrikeIron, or flight data from travel information services like FlightStats.com, or those aggregated through mashery.com, or data sourced via public APIs like map information from Google Maps.

Some of these data sources will be built into the Cloud Action Platform and available for free, but others will be made available through a Cloud Action Platform and/or a Data Platform SDK, but have an extra cost associated with them.

In addition to the above, the Cloud Action Platform Component Developer will also make it possible for third-party developers to create custom data sources, and make them available for consumption by other Cloud Action Platform users (either for free or for a fee via an Action App Store).

The system described above may also have an analytic engine that provides the ability to analyze data of various types and volumes whether streaming or at-rest. The Analytic Engine will handle traditional structured and unstructured data as well as non-traditional data sources such as Twitter and RSS feeds. The analytic engine will be able to interface with on-premise and cloud-based databases and enterprise applications.

The system may also have a data acquisition engine that will provide the ability to replicate data from SaaS, PaaS and Enterprise Databases. Data volumes, security concerns and compliance regulations may require direct connections from the Action Platform to the data source; this will be facilitated by the Data Integration Engine. The Action/Event Integration Engine will facilitate the integration of streaming or event data. This data may be stored locally in the Analytic Engine for future analysis or may be accessed directly by the Action Platform.

"Power User" User Interface

The system may also have a "Power User" User Interface. The Action App Developer uses the platform to create apps—combinations of data sources, analytics, process/business logic and actions—that are made available to other users. This function is aimed at 'power users' rather than programmers, so this function is designed to make it as easy as possible to use the platform to develop tactical apps, as well as to package up those apps for consumption by others. These developers build in configuration parameters to their app which can be customized and tailored by the end users. For example, the App Developer might set some default thresholds for creating alerts when events happen, but will mark these items as configurable, so that the end user of the App can customize these thresholds. Only those aspects of the app that are declared as configurable will work in this way, hence allowing the real process and connector complexity of an app to be hidden from the end user.

If an app is to be consumed by others, it will be possible to customize the app upon purchase, to point it at your specific data sources (perhaps just by adding security details such as login authentication and URL details for the Web Service endpoints). This configuration process needs to be externalized from the internals of the application, so that configuration data can be supplied easily without risk of breaking other parts of the app.

A hierarchy of configuration data could be set up, so that default configuration data could be supplied to work for any user within a given organization or group, but they could supply more personalized information for specific systems if they have it, to get access to different levels of data. Alternatively, an app may ship with no configuration data, and only works once a user has set it up with their own login data for the systems it accesses.

The developer workbench will support features for adding collaboration to an app, for example by clearly defining the user roles for the app using 'swimlane' notations or similar. This would also help to set the security requirements for the app, as app functionality and users would then be clearly organized into groups which in turn have roles, and any user's set of permissions would be the combination of all roles from all groups that they are members of.

The 'power user' developer is someone who is capable of writing quite complex spreadsheet models including formulae and simple macros. They are not programmers, but sometimes undertake business tasks which require them to approach that level of understanding of program logic and flow control. These users will typically be the ones who supply domain-specific knowledge to a process, and assemble component pieces in order to create an app.

The developer will model the process or workflow of the app in a visual way, in order to make the environment accessible for non-programmers. Components should be provided in a 'toolbox' to allow them to use specific component types when needed—e.g. to retrieve Sales data from SAP.

This App Developer interface needs to be browser-based, in order to provide for broad accessibility to a business-user audience.

Component Developer

The platform is open to programmers and allows them to create components that could subsequently be consumed by app developers.

These components could be specific app connectors, or an SDK that configures the data source and triggers through a specialized Cloud Action Server interface; for example, a developer could take an API provided to call a Web Service, and put a specific wrapper around this to make it even easier to call the Web Services made available by SAP. Typically, there is a calling protocol required (e.g. login to authenticate the user, make the call you want using a rather obscure and hard to navigate API, then log out again) which can be quite hard to get to grips with for a non-programmer. A developer could create a component to make it very easy to make a call into SAP to get a specific type of data out—e.g. Sales data—by wrapping the Web Services API with the specific calling sequence required to get this data set out of SAP. In this way, it would also be possible for an infrastructure developer to monetize the components they create (if they want to) if we were to provide a facility to charge for a component that saves another developer a lot of time. This would all help to create an eco-system of interested parties, so not only would we have an Action App Store, we would also have an 'Action App Component Store'.

The component builder defines interfaces to components in the Cloud Action Platform, so that app developers can access them through the App developer interface. Example sources that can be assembled into components:

Applications with published API's, e.g. Salesforce, LinkedIn, Google Analytics

Transactional databases, e.g. Oracle, SQL Server

Hadoop filesystems

Streaming data, e.g. Twitter, financial data feeds

A further option would be to consider whether to enable the purchase of data items from within an App as an in-App purchase, in the way that iOS games etc allow for this. This makes it easy for users to try out apps, then convert them to full-feature versions without having to go back and search the app store again.

This component development approach will use a REST interface that provides access to the platform infrastructure, to allow for the widest possible range of options for languages and platforms in which to write components, and to minimize the coupling between components and the runtime platform.

Additionally, a graphical user interface will be provided for component developers to configure specialized access to a full data platform that abstracts the data access and data events away from the Cloud Action Server.

The system described above may also include (API)/integration routines for allowing BI suites (standalone or tightly integrated) to pass "Insight Parameters" from BI charts, reports or predictive outputs across to the Cloud Action Platform for the automatic creation of Action Apps based on these "Insight Parameters". "Insight Parameters" can include, but are not limited to, the data streams being analysed in the BI suite together with the triggers i.e. thresholds of certain data values, at which important business events occur.

Figures 9, 10:
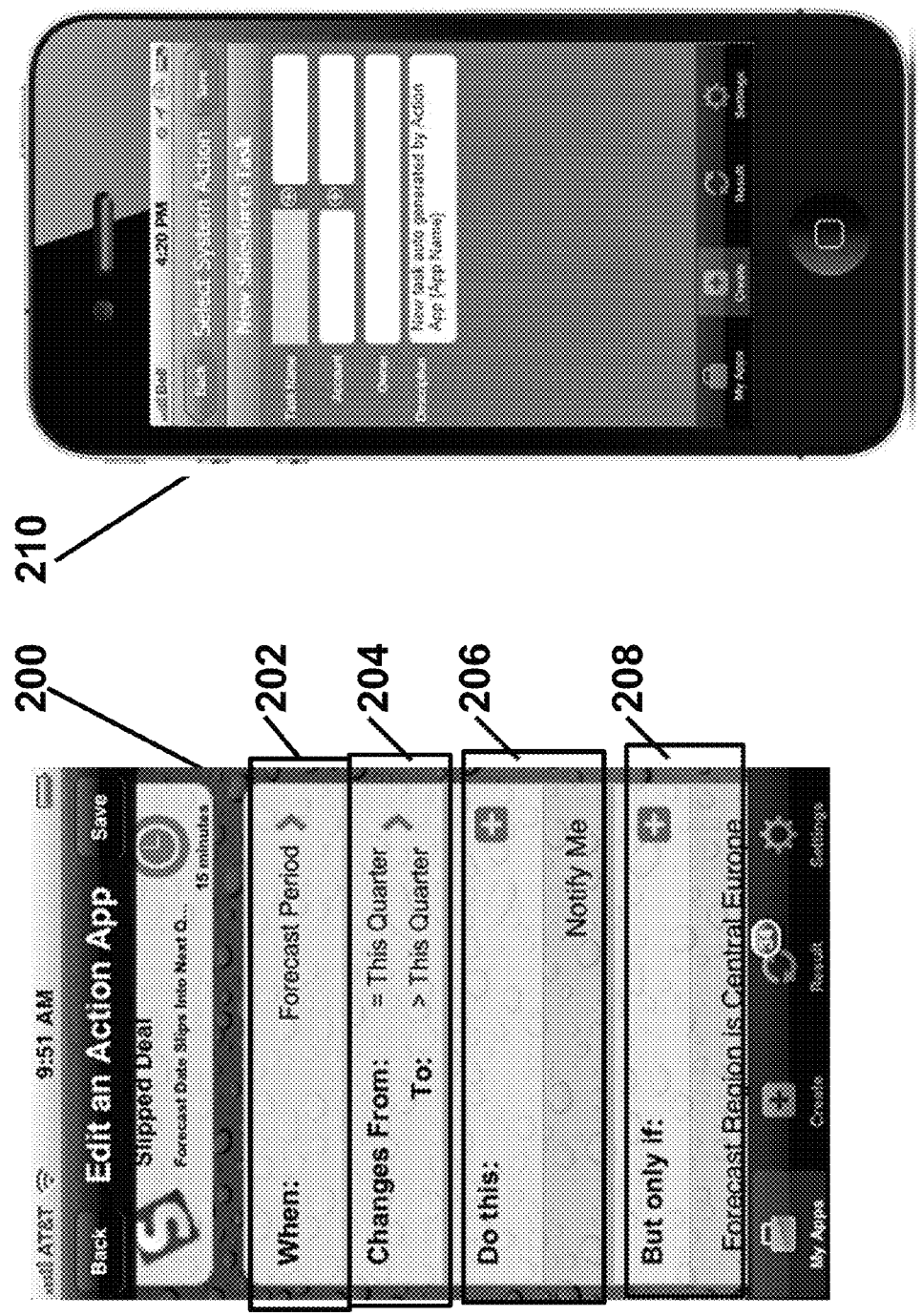
FIG. 9 is an example of an action app interface that may be implemented using the cloud action platform in FIGS. 1-2B.
FIG. 10 illustrates an example of a user interface for defining a system action of an action app.

FIG. 9 is an example of an action app interface 200 that may be implemented using the cloud action platform in FIGS. 1-2B. In this example, four programming control structures are encoded that together, make-up an Action App. For this particular example Action App, the user wants to review Central Europe sales deals that slip from one quarter to the next. To do this, the user can set-up/configure the Action App with the action and the trigger event that triggers the action once the trigger event occurs. The user may tap on a "when" portion 202 of the user interface that displays available data sources and the fields associated with the data source. The user selects a field of the data source in which the user has an interest to look at for changes. In this example, a "Forecast Period" field was chosen.

The user may then tap on a "Changes" portion 204 of the user interface that enables the user to define the change event that the user wants to monitor. In this example, the user has selected that they want to know when the value of the forecast period changes from "This Quarter" to "Next Quarter" for the "Forecast Period" field. The user may then tap on a "Do This" portion 206 that is used to specify an action when the change occurs. In this instance, the Action that was chosen was "Notify Me", which will send an alert to the user when the condition is true. The user may then tap on a "But Only If" portion 208 that allows the user to refine the criteria that an Action App will use to determine if a change event/trigger event has occurred. In this instance, the program will only initiate an Action when the "Forecast Region" field is equal to "Central Europe". Once the Action App is defined, the Action App will begin executing on the Cloud Action Platform and generating actions when the specified triggering events and filtering criteria are met.

FIG. 10 illustrates an example a user interface 210 for defining a system action of an Action App. In this example, the app developer would enter the necessary fields to create a new Salesforce task when defining the application. This would be saved with the application, and when the qualifying criteria is met, this action would be executed.

Figure 11:
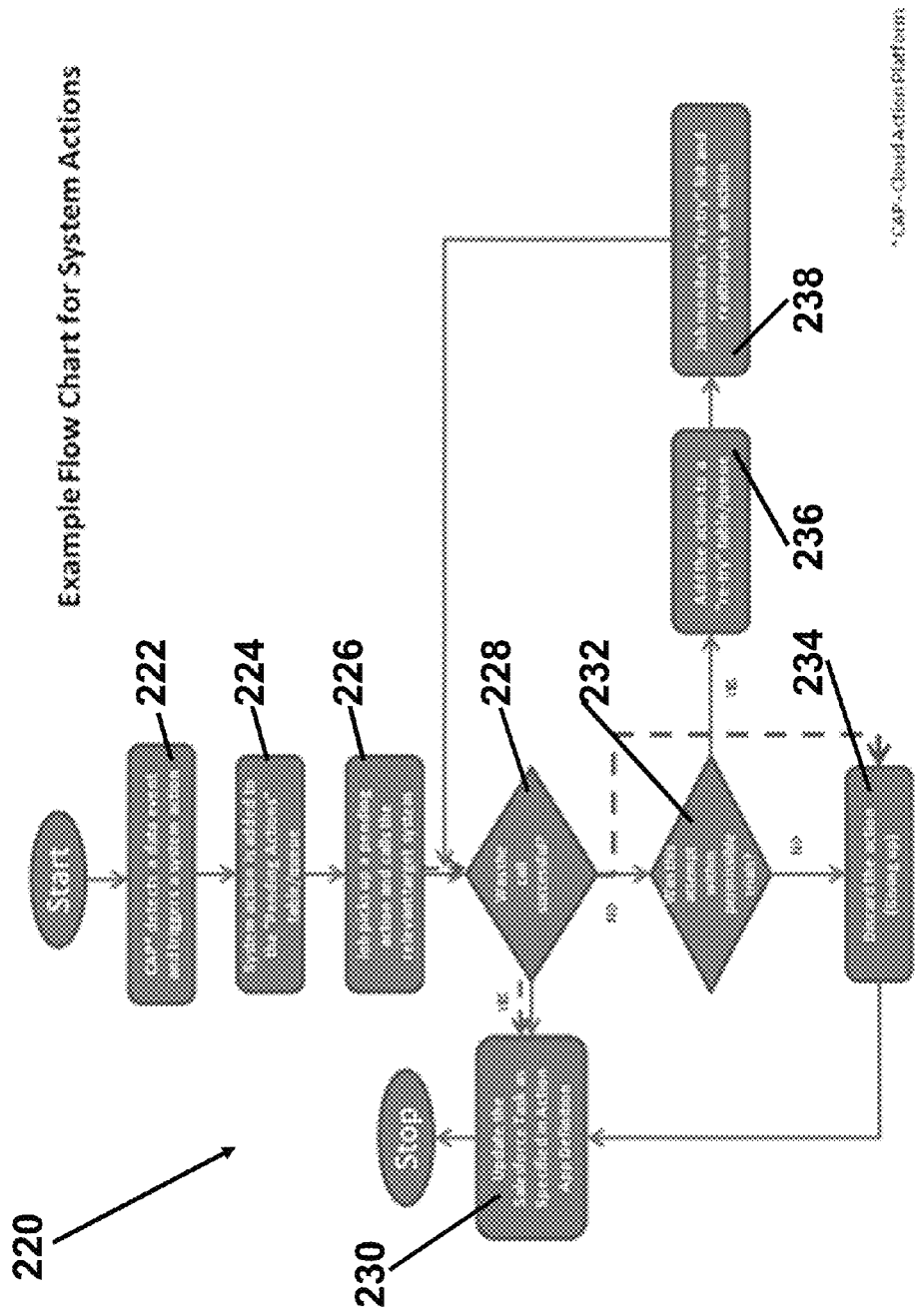
FIG. 11 illustrates a method for execution of an action in the cloud action platform.

The flow of execution 220 of the system action is shown in FIG. 11. In the execution method, the action app platform (and/or one or more units/elements the cloud app platform) performs the processes shown in FIG. 11. In the method, the a trigger event is detected and a system action is triggered (202.) The triggered system action is then added to a pending action table/queue (224) and then a job that is part of the cloud action platform picks up the pending action and calls the relevant target system/data source (226.) The method then determines if the call was successful (228) and if the call was successful, the method updates the Saleforce task (for the example action app in FIG. 9) as specified by the action of the Action app (230) and the method is completed. If the call was not successful, the method determines if the attempt was within permissible trials (232) and adds the action to a re-try table/queue (236) if the attempt was within the permissible trials and then the method monitors the re-try list and re-attempts the action (238) and loops back to process 228. If the attempt was not within the permissible trials, the method discards the action (234), updates the Action App (230) and the method is completed.

While the foregoing has been with reference to a particular embodiment of the invention, it will be appreciated by those skilled in the art that changes in this embodiment may be made without departing from the principles and spirit of the disclosure, the scope of which is defined by the appended claims.

The invention claimed is:

1. An application platform for action-oriented business applications for a plurality of data sources, the platform comprising:

an action server that facilitates one of the development and the use of one or more action-oriented business applications, wherein a particular action-oriented business application performs an action when a trigger event occurs, the trigger event occurring in response to an event within a particular one or more data sources of the plurality of data sources;

a data probe connected to each data source, each data probe unlocking each data source for the data probe to access the data source;

the action server interacts with the particular action-oriented business application that monitors the particular one or more data sources using the data probes for the particular one or more data sources for the trigger event and performs the action based on the trigger event;

a computing device that downloads an action app that corresponds to the particular action-oriented business application, the action app runs in the background of the computing device until receiving a notification from the action server that the trigger event has occurred and performing the action based on the trigger event.

2. The platform of claim 1, wherein the action server is cloud based.

3. The platform of claim 1, wherein the action server stores a plurality of pieces of action logic, wherein each piece of action logic is used by the action-oriented business application.

4. The platform of claim 3, wherein the plurality of pieces of action logic are one of one or more classes of action-oriented business application, actions flows and action decision points used by the action-oriented business application.

5. The platform of claim 1, wherein the action server further comprises one or more data probes, wherein each data probe is used to monitor a particular data source of the one or more data sources.

6. The platform of claim 1 further comprising an app store coupled to the action server, the app store providing distribution of the action-oriented business application.

7. The platform of claim 6, wherein the app store is one of a public app store and a private app store.

8. The platform of claim 1, wherein the action server further comprises an app builder that configures the action-oriented business application.

9. The platform of claim 8 further comprising one or more computing devices, wherein each computing device interacts with the action server and wherein the app builder is downloaded to the computing device and executed by a processor of the computing device.

10. The platform of claim 8, wherein the app builder sets a value and a threshold of a trigger event for the action-oriented business application.

11. The platform of claim 1, wherein the action server further comprises a component builder that builds components of the action-oriented business application.

12. The platform of claim 11 further comprising one or more computing devices, wherein each computing device interacts with the action server and wherein the component builder is downloaded to the computing device and executed by a processor of the computing device.

13. The platform of claim 6, wherein the action server comprises an app builder pro that builds the action-oriented business application and publishes the action-oriented business application to the app store.

14. The platform of claim 13 further comprising one or more computing devices, wherein each computing device interacts with the action server and wherein the app builder pro is downloaded to the computing device and executed by a processor of the computing device.

15. The platform of claim 1, wherein the action is one of a notification, an automatic action and a series of actions.

16. The platform of claim 1 further comprising a software development kit that defines the one or more data sources, the event trigger and the action of the action-oriented business application.

17. The platform of claim 1, wherein the action server hosts a plurality of action-oriented business applications wherein each action-oriented business application has a trigger event and an action to perform based on the trigger event.

18. A method for interfacing with action-oriented business applications for a plurality of data sources, the method comprising:
    facilitating, using an action server, one of the development and the use of one or more action-oriented business applications, wherein a particular action-oriented business application performs an action when a trigger event occurs, the trigger event occurring in response to an event within a particular one or more data sources of the plurality of data sources;
    unlocking, using a data probe connected to each data source, each data source for the data probe to access the data source;
    interacting, by the action server, with the particular action-oriented business application that monitors the particular one or more data sources using the data probes for the particular one or more data sources for the trigger event and performs the action based on the trigger event;
    downloading an action app that corresponds to the particular action-oriented business application to a computing device, the action app runs in the background of the computing device until receiving a notification from the action server that the trigger event has occurred; and
    performing the action based on the trigger event on the computing device.

19. The method of claim 18 further comprising storing, using an action server, a plurality of pieces of action logic, wherein each piece of action logic is used by the action-oriented business application.

20. The method of claim 19, wherein the plurality of pieces of action logic are one of one or more classes of action-oriented business applications, actions flows and action decision points used by the action-oriented business application.

21. The method of claim 18 further comprising monitoring, using one or more data probes, a particular data source of the one or more data sources.

22. The method of claim 18 further comprising providing, using an app store coupled to the action server, distribution of the action-oriented business application.

23. The method of claim 18 further comprising configuring the action-oriented business application using an app builder.

24. The method of claim 23 further comprising downloading the app builder to a computing device and executing the app builder by a processor of the computing device.

25. The method of claim 24, wherein the app builder sets a value and a threshold of a trigger event for the action-oriented business application.

26. The method of claim 18 further comprising building, by a component builder, components of the action-oriented business application.

27. The method of claim 26 further comprising downloading the component builder to the computing device and executing the component builder by a processor of the computing device.

28. The method of claim 18 further comprising building and publishing the action-oriented business application using an app builder pro.

29. The method of claim 28 further comprising downloading the app builder pro to a computing device and executing the app builder pro by a processor of the computing device.

30. The method of claim 18, wherein the action is one of a notification, an automatic action and a series of actions.

31. The method of claim 18 further comprising defining, using a software development kit, the one or more data sources, the event trigger and the action of the action-oriented business application.

32. A computer system, comprising:
    a memory; and
    a processor connected to the memory, the processor executing an action-oriented business application and a data probe connected to each data source, each data probe unlocking each data source for the data probe to access the data source, the action-oriented business application automatically performs an action when a trigger event occurs on a particular one or more data sources of a remote action server and in response to an event within the particular one or more data sources, wherein the event is an occurrence of a particular piece of information in the particular one or more data sources by monitoring the particular one or more data sources using the data probes for the particular one or more data sources and the action is one of a notification, an automated action and a series of actions and the action-oriented business application executes in the background of the computer system and is notified by the remote action server when the trigger event occurs to perform the action on the computer system.

33. The computer system of claim 32, wherein the action-oriented business application further comprises one or more components that affect the trigger event and the action of the action-oriented business application.

34. The computer system of claim 32, wherein the action-oriented business application interfaces with a data probe that monitors the one or more data sources for the occurrence of the particular piece of information.

35. The computer system of claim 32, wherein the action-oriented business application has a plurality of trigger events, wherein each trigger event occurs in response to an event within one or more data sources.

* * * * *